US011790523B2

(12) United States Patent
Niemeijer et al.

(10) Patent No.: US 11,790,523 B2
(45) Date of Patent: Oct. 17, 2023

(54) AUTONOMOUS DIAGNOSIS OF A DISORDER IN A PATIENT FROM IMAGE ANALYSIS

(71) Applicant: Digital Diagnostics Inc., Coralville, IA (US)

(72) Inventors: Meindert Niemeijer, Prairie Village, KS (US); Ryan Amelon, North Liberty, IA (US); Warren Clarida, Cedar Rapids, IA (US); Michael D. Abramoff, University Heights, IA (US)

(73) Assignee: Digital Diagnostics Inc., Coralville, IA (US)

( * ) Notice: Subject to any disclaimer, the term of this patent is extended or adjusted under 35 U.S.C. 154(b) by 318 days.

(21) Appl. No.: 16/175,318

(22) Filed: Oct. 30, 2018

(65) Prior Publication Data

US 2019/0130566 A1    May 2, 2019

Related U.S. Application Data

(62) Division of application No. 15/092,421, filed on Apr. 6, 2016, now Pat. No. 10,115,194.
(Continued)

(51) Int. Cl.
*G06T 7/00* (2017.01)
*G06N 3/08* (2023.01)
(Continued)

(52) U.S. Cl.
CPC ........ *G06T 7/0012* (2013.01); *G06F 18/2148* (2023.01); *G06N 3/045* (2023.01);
(Continued)

(58) Field of Classification Search
CPC ............................................ G06T 2207/30041
See application file for complete search history.

(56) References Cited

U.S. PATENT DOCUMENTS

| 4,883,061 A | 11/1989 | Zeimer |
| 4,998,533 A | 3/1991 | Winkelman |
| (Continued) | | |

FOREIGN PATENT DOCUMENTS

| AU | 2012207076 A1 | 8/2013 |
| AU | 2016210680 A1 | 8/2016 |
| (Continued) | | |

OTHER PUBLICATIONS

Abramoff, M. et al., "Image Processing with ImageJ," Biophotonics International, Jul. 2004, pp. 36-42, vol. 11, No. 7.
(Continued)

*Primary Examiner* — Gandhi Thirugnanam
(74) *Attorney, Agent, or Firm* — Fenwick & West LLP

(57) ABSTRACT

A device receives an input image of a portion of a patient's body, and applies the input image to a feature extraction model, the feature extraction model comprising a trained machine learning model that is configured to generate an output that comprises, for each respective location of a plurality of locations in the input image, an indication that the input image contains an object of interest that is indicative of a presence of a disease state at the respective location. The device applies the output of the feature extraction model to a diagnostic model, the diagnostic model comprising a trained machine learning model that is configured to output a diagnosis of a disease condition in the patient based on the output of the feature extraction model. The device outputs the determined diagnosis of a disease condition in the patient obtained from the diagnostic model.

30 Claims, 8 Drawing Sheets

Related U.S. Application Data

(60) Provisional application No. 62/143,301, filed on Apr. 6, 2015.

(51) Int. Cl.
  *G06V 10/44* (2022.01)
  *G06F 18/214* (2023.01)
  *G06N 3/045* (2023.01)
  *G06V 10/82* (2022.01)

(52) U.S. Cl.
  CPC ............. *G06N 3/08* (2013.01); *G06V 10/454* (2022.01); *G06V 10/82* (2022.01); *G06T 2207/20081* (2013.01); *G06T 2207/20084* (2013.01); *G06T 2207/30041* (2013.01)

(56) References Cited

U.S. PATENT DOCUMENTS

| | | | |
|---|---|---|---|
| 5,153,923 A * | 10/1992 | Matsuba | G06N 3/04 |
| | | | 382/158 |
| 5,233,517 A | 8/1993 | Jindra | |
| 5,270,924 A | 12/1993 | Hideshima | |
| 5,303,709 A | 4/1994 | Dreher et al. | |
| 5,557,686 A * | 9/1996 | Brown | G07C 9/33 |
| | | | 382/209 |
| 5,857,030 A | 1/1999 | Gaborski et al. | |
| 5,868,134 A | 2/1999 | Sugiyama et al. | |
| 5,878,746 A * | 3/1999 | Lemelson | G16H 30/40 |
| | | | 600/407 |
| 6,000,799 A | 12/1999 | Van de Velde | |
| 6,003,993 A | 12/1999 | Webb | |
| 6,044,181 A | 3/2000 | Szeliski et al. | |
| 6,053,865 A | 4/2000 | Sugiyama et al. | |
| 6,104,828 A | 8/2000 | Shioiri | |
| 6,179,421 B1 | 1/2001 | Panq | |
| 6,276,798 B1 | 8/2001 | Gil et al. | |
| 6,453,057 B1 | 9/2002 | Marshall et al. | |
| 6,549,646 B1 * | 4/2003 | Yeh | G06V 30/244 |
| | | | 382/199 |
| 6,556,853 B1 | 4/2003 | Cabib et al. | |
| 6,567,682 B1 | 5/2003 | Osterweil et al. | |
| 6,674,894 B1 | 1/2004 | Parker et al. | |
| 6,712,469 B2 | 3/2004 | Ando | |
| 6,714,672 B1 | 3/2004 | Berestov et al. | |
| 6,728,561 B2 | 4/2004 | Smith et al. | |
| 6,731,782 B2 | 5/2004 | Ashton | |
| 6,757,409 B2 | 6/2004 | Marshall et al. | |
| 6,830,336 B2 | 12/2004 | Fransen | |
| 6,845,260 B2 | 1/2005 | Liu et al. | |
| 6,996,260 B1 | 2/2006 | Skands et al. | |
| 7,104,958 B2 | 9/2006 | Crutchfield et al. | |
| 7,206,435 B2 | 4/2007 | Fujimura et al. | |
| 7,232,240 B2 | 6/2007 | Kosnik et al. | |
| 7,242,810 B2 | 7/2007 | Chang | |
| 7,343,032 B2 | 3/2008 | Oakley et al. | |
| 7,474,775 B2 * | 1/2009 | Abramoff | G06F 18/2415 |
| | | | 382/128 |
| 7,524,061 B2 | 4/2009 | Yan et al. | |
| 7,574,028 B2 | 8/2009 | Luo et al. | |
| 7,578,028 B2 | 8/2009 | Sellars | |
| 7,620,501 B2 | 11/2009 | Tek et al. | |
| 7,712,898 B2 | 5/2010 | Abramoff et al. | |
| 7,715,597 B2 | 5/2010 | Costache et al. | |
| 8,140,329 B2 | 3/2012 | Zhang et al. | |
| 8,180,134 B2 | 5/2012 | Wang | |
| 8,194,936 B2 | 6/2012 | Abramoff et al. | |
| 8,340,437 B2 | 12/2012 | Abramoff et al. | |
| 8,463,065 B2 | 6/2013 | Sun et al. | |
| 8,611,623 B2 | 12/2013 | Kurihara et al. | |
| 8,616,702 B2 | 12/2013 | Abramoff | |
| 8,634,628 B2 | 1/2014 | Inoue | |
| 8,639,002 B2 | 1/2014 | Tanaka et al. | |
| 8,761,473 B2 | 6/2014 | Ihara | |
| 8,842,894 B2 | 9/2014 | Ihara | |
| 8,879,813 B1 * | 11/2014 | Solanki | G16H 50/20 |
| | | | 382/128 |
| 8,965,112 B1 * | 2/2015 | Ibarz | G06V 10/774 |
| | | | 382/176 |
| 9,307,926 B2 | 4/2016 | Begin et al. | |
| 9,355,458 B2 | 5/2016 | Ihara | |
| 9,545,196 B2 | 1/2017 | Abramoff et al. | |
| 9,679,389 B2 | 6/2017 | Ostrovsky-Berman et al. | |
| 9,881,234 B2 * | 1/2018 | Huang | G06F 18/2411 |
| 10,223,610 B1 * | 3/2019 | Akselrod-Ballin | G06T 7/174 |
| 10,430,946 B1 * | 10/2019 | Zhou | G06N 3/047 |
| 2002/0024516 A1 | 2/2002 | Chen et al. | |
| 2002/0126915 A1 | 9/2002 | Lai et al. | |
| 2002/0165837 A1 | 11/2002 | Zhang et al. | |
| 2003/0071970 A1 | 4/2003 | Donnerhacke et al. | |
| 2003/0133605 A1 * | 7/2003 | Tannhof | G06T 3/4046 |
| | | | 382/156 |
| 2003/0166999 A1 | 9/2003 | Liu et al. | |
| 2003/0215119 A1 | 11/2003 | Uppaluri et al. | |
| 2004/0032488 A1 | 2/2004 | Harman | |
| 2004/0037453 A1 | 2/2004 | Marshall et al. | |
| 2004/0064057 A1 | 4/2004 | Siegel | |
| 2004/0085542 A1 | 5/2004 | Soliz et al. | |
| 2004/0105074 A1 | 6/2004 | Soliz et al. | |
| 2005/0100208 A1 * | 5/2005 | Suzuki | G06T 5/30 |
| | | | 382/128 |
| 2005/0129306 A1 * | 6/2005 | Wang | G06T 5/002 |
| | | | 348/E5.064 |
| 2006/0023990 A1 | 2/2006 | Shih et al. | |
| 2006/0056727 A1 | 3/2006 | Jones et al. | |
| 2006/0119858 A1 | 6/2006 | Knighton et al. | |
| 2006/0140446 A1 | 6/2006 | Luo et al. | |
| 2006/0251293 A1 * | 11/2006 | Piirainen | B60R 21/01512 |
| | | | 382/104 |
| 2006/0257031 A1 * | 11/2006 | Abramoff | G06T 7/0012 |
| | | | 382/128 |
| 2007/0002275 A1 | 1/2007 | Yan et al. | |
| 2007/0020795 A1 | 1/2007 | Mori et al. | |
| 2007/0058865 A1 | 3/2007 | Li et al. | |
| 2007/0083492 A1 | 4/2007 | Hohimer et al. | |
| 2007/0092864 A1 | 4/2007 | Reinhardt et al. | |
| 2007/0110298 A1 | 5/2007 | Graepel et al. | |
| 2007/0122007 A1 | 5/2007 | Austin et al. | |
| 2007/0183661 A1 | 8/2007 | El-Maleh et al. | |
| 2007/0230795 A1 | 10/2007 | Abramoff et al. | |
| 2007/0244396 A1 | 10/2007 | Vilser et al. | |
| 2007/0253171 A1 | 11/2007 | Cheng et al. | |
| 2008/0205717 A1 | 8/2008 | Reeves et al. | |
| 2008/0240547 A1 | 10/2008 | Cho et al. | |
| 2008/0267483 A1 | 10/2008 | Zhan et al. | |
| 2008/0309881 A1 | 12/2008 | Huang et al. | |
| 2009/0148024 A1 | 6/2009 | Park | |
| 2009/0257024 A1 | 10/2009 | Luther et al. | |
| 2010/0002929 A1 | 1/2010 | Sammak et al. | |
| 2010/0034457 A1 | 2/2010 | Berliner et al. | |
| 2010/0061601 A1 | 3/2010 | Abramoff et al. | |
| 2010/0074532 A1 | 3/2010 | Gordon et al. | |
| 2010/0082692 A1 | 4/2010 | Akinyemi et al. | |
| 2010/0103249 A1 | 4/2010 | Lipton et al. | |
| 2010/0104150 A1 | 4/2010 | Saint Felix et al. | |
| 2010/0118161 A1 | 5/2010 | Tsurumi | |
| 2010/0142767 A1 | 6/2010 | Fleming | |
| 2010/0142824 A1 | 6/2010 | Lu | |
| 2010/0177943 A1 | 7/2010 | Zhao et al. | |
| 2010/0182406 A1 | 7/2010 | Benitez | |
| 2010/0271511 A1 | 10/2010 | Ma et al. | |
| 2010/0278420 A1 * | 11/2010 | Shet | G06F 18/24765 |
| | | | 382/156 |
| 2010/0284180 A1 | 11/2010 | Popovich et al. | |
| 2011/0026794 A1 | 2/2011 | Sundar et al. | |
| 2011/0091083 A1 * | 4/2011 | Liu | G06T 7/0012 |
| | | | 382/128 |
| 2011/0134221 A1 | 6/2011 | Lee et al. | |
| 2011/0135172 A1 | 6/2011 | Kitamura | |
| 2012/0155726 A1 * | 6/2012 | Li | A61B 3/1176 |
| | | | 382/128 |
| 2012/0236259 A1 | 9/2012 | Abramoff et al. | |
| 2012/0237094 A1 | 9/2012 | Kurihara et al. | |

(56) References Cited

U.S. PATENT DOCUMENTS

| | | | |
|---|---|---|---|
| 2013/0108131 A1 | 5/2013 | Abramoff et al. | |
| 2013/0208960 A1 | 8/2013 | Reisman | |
| 2013/0301889 A1* | 11/2013 | Abramoff | G06V 40/193 |
| | | | 382/128 |
| 2014/0016832 A1* | 1/2014 | Kong | A61B 5/0077 |
| | | | 382/115 |
| 2014/0035901 A1 | 2/2014 | Chen et al. | |
| 2014/0035909 A1 | 2/2014 | Abramoff et al. | |
| 2014/0355861 A1* | 12/2014 | Nirenberg | H04N 19/60 |
| | | | 382/133 |
| 2015/0112182 A1* | 4/2015 | Sharma | A61B 6/5217 |
| | | | 600/408 |
| 2015/0289822 A1* | 10/2015 | Dugan | A61B 5/746 |
| | | | 600/588 |
| 2015/0379708 A1* | 12/2015 | Abramoff | G06F 18/2135 |
| | | | 382/128 |
| 2016/0035088 A1 | 2/2016 | Abramoff et al. | |
| 2016/0071266 A1* | 3/2016 | Srivastava | G06T 7/0016 |
| | | | 382/130 |
| 2016/0100766 A1* | 4/2016 | Yoshioka | A61B 5/0082 |
| | | | 600/301 |
| 2016/0104058 A1* | 4/2016 | He | G06F 16/583 |
| | | | 382/156 |
| 2016/0217586 A1* | 7/2016 | Dickrell, III | G06T 7/11 |
| 2016/0292856 A1* | 10/2016 | Niemeijer | G06V 10/82 |
| 2017/0014089 A1* | 1/2017 | Murakami | A61B 5/024 |
| 2017/0098311 A1 | 4/2017 | Abramoff et al. | |
| 2017/0147905 A1* | 5/2017 | Huang | G06V 40/165 |
| 2017/0169567 A1* | 6/2017 | Chefd'hotel | G06T 7/0012 |
| 2017/0209096 A1* | 7/2017 | Ishii | A61B 5/6805 |
| 2017/0215812 A1* | 8/2017 | Yamaji | A61B 5/1123 |
| 2017/0236282 A1 | 8/2017 | Abramoff et al. | |
| 2018/0225823 A1* | 8/2018 | Zhou | G06T 7/11 |
| 2018/0240233 A1* | 8/2018 | Kiraly | G06T 7/0012 |
| 2019/0059718 A1 | 2/2019 | Abramoff et al. | |
| 2019/0130566 A1* | 5/2019 | Niemeijer | G06F 18/2148 |
| 2019/0164278 A1 | 5/2019 | Abramoff et al. | |

FOREIGN PATENT DOCUMENTS

| | | |
|---|---|---|
| CA | 2610345 A1 | 12/2006 |
| CA | 2825169 A1 | 7/2012 |
| EP | 0905509 A1 | 3/1999 |
| EP | 2665406 A1 | 11/2013 |
| JP | 2007-097634 A | 4/2007 |
| JP | 2010-500081 A | 1/2010 |
| JP | 60-05663 B2 | 10/2016 |
| WO | WO-89/05493 A1 | 6/1989 |
| WO | WO-2005/076198 A1 | 8/2005 |
| WO | WO-2006/023990 A2 | 3/2006 |
| WO | WO-2006/105473 A2 | 10/2006 |
| WO | WO-2007/031818 A1 | 3/2007 |
| WO | WO-2007/118079 A2 | 10/2007 |
| WO | WO-2008/150840 A1 | 12/2008 |
| WO | WO-2010/099289 A1 | 9/2010 |
| WO | WO-2012/078636 A1 | 6/2012 |
| WO | WO-2012/100221 A1 | 7/2012 |
| WO | WO-2012/100225 A1 | 7/2012 |
| WO | WO-2012/106677 A2 | 8/2012 |
| WO | WO-2013/110668 A1 | 8/2013 |
| WO | WO-2014/143891 A1 | 9/2014 |
| WO | WO-2014/158345 A1 | 10/2014 |
| WO | WO-2015/143435 A1 | 9/2015 |

OTHER PUBLICATIONS

Adelson, E. H. et al., "Pyramid methods in image processing," RCA Engineer. Nov./Dec. 1984, pp. 33-41, vol. 29. No. 6.

Agurto, C. et al., "Detection and Phenotyping of Retinal Disease using AM-FM Processing for Feature Extraction," IEEE, 42$^{nd}$ Asilomar Conference on Signals, Systems and Computers, 2008, pp. 659-663.

Agurto, C. et al., "Multiscale AM-FM Methods for Diabetic Retinopathy Lesion Detection," IEEE Transactions on Medical Imaging, Feb. 2010, pp. 502-512, vol. 29, No. 2.

Barriga, E. S. et al., "Automatic system for diabetic retinopathy screening based on AM-FM, partial least squares, and support vector machines," 2010 IEEE International Symposium on Biomedical Imaging: From Nano to Macro, Apr. 2010, pp. 1349-1352.

Barriga, E. S. et al., "Multi-scale AM-FM for lesion phenotyping on age-related macular degeneration," 22nd IEEE International Symposium on Computer-Based Medical Systems, Aug. 2009, five pages.

Boroujeni, F. Z. et al., "Coronary Artery Center-line Extraction Using Second Order Local Features," Computational and Mathematical Methods in Medicine, 2012, 21 pages.

Can, A. et al., "A Feature-Based Robust, Hierarchical, Algorithm for Registering Pairs of Images of the Curved Human Retina," IEEE Transactions on Pattern Analysis and Machine Intelligence, Mar. 2002, pp. 347-364, vol. 24, No. 3.

Can, A. et al., "A Feature-Based Technique for Joint, Linear Estimation of High-Order Image-to-Mosaic Transformations: Mosaicing the Curved Human Retina," IEEE Transactions on Pattern Analysis and Machine Intelligence, Mar. 2002, pp. 412-419, vol. 24, No. 3.

Can, A. et al., "Rapid Automated Tracing and Feature Extraction from Retinal Fundus Images Using Direct Exploratory Algorithms," IEEE Transactions on Information Technology in Biomedicine, Jun. 1999, pp. 125-138, vol. 3, No. 2.

Chanwimaluang, T., Hybrid Retinal Image Registration, IEEE Transactions on Information Technology in Biomedicine, Jan. 2006, pp. 129-142, vol. 10, No. 1.

Choe, T. E. et al., "Optimal Global Mosaic Generation from Retinal Images," 18th International Conference on Pattern Recognition, Aug. 2006, pp. 681-684, vol. 3.

Chrastek, R. et al., "Automated Calculation of Retinal Arteriovenous Ratio for Detection and Monitoring of Cerebrovascular Disease Based on Assessment of Morphological Changes of Retinal Vascular System," MVA 2002 IAPR Workshop on Machine Vision Applications. 2002, pp. 240-243.

Chrastek, R. et al., "Automated Segmentation of the Optic Nerve Head for Diagnosis of Glaucoma," Medical Image Analysis, Aug. 2005, pp. 297-314, vol. 9, No. 4.

Deng, K. et al., "Retinal Fundus Image Registration via Vascular Structure Graph Matching," International Journal of Biomedical Imaging, 2010, 13 pages.

Eye Conditions Encyclopedia, "Optic Nerve Imaging" EyeMDLink.com, Dec. 3, 2005, pp. 1-2.

Frangi, A. F. et al., "Multiscale Vessel Enhancement Filtering," Medical Image Computing and Computer-Assisted Intervention—MICCAI'98 Lecture Notes in Computer Science, Oct. 1998, pp. 130-137.

Goatman, K., "Automated Detection of Microaneurysms," Abstracts Reports: Bio-medical Physics & Bio-Engineering, University of Aberdeen. Retrieved from: <www.biomed.abdn.ac.uk/Abstracts/A07890/>. Jul. 10, 1997, 8 pages.

Hackel, R. E. et al., "Creating Retinal Fundus Maps," The Journal of Ophthalmic Photography, 2005, 10 pages, vol. 27, No. 1.

Huang, M.-L. et al., "Development and Comparison of Automated Classifiers for Glaucoma Diagnosis Using Stratus Optical Coherence Tomography," Investigative Ophthalmology & Visual Science, Nov. 2005, 4121-4129, vol. 46, No. 11.

Hyvarinen, A. et al., "Independent Component Analysis: Algorithms and Applications," Neural Networks, Jun. 2000, 31 pages, vol. 13, No. 4-5.

Johnson, C. A. et al., "Structure and Function Evaluation (SAFE): II. Comparison of Optic Disk and Visual Field Characteristics," American Journal of Ophthalmology, Feb. 2003, pp. 148-154, vol. 135, No. 2.

Klein, B. E. et al., "Cardiovascular Disease, Mortality, and Retinal Microvascular Characteristics in Type 1 Diabetes," Archives of Internal Medicine, Sep. 27, 2004, pp. 1917-1924, vol. 164, No. 17.

Kondermann, C. et al., "Blood Vessel Classification into Arteries and Veins in Retinal Images," Medical Imaging 2007: Image Processing, Mar. 2007, pp. 1-9, vol. 6512, No. 651247.

(56) References Cited

OTHER PUBLICATIONS

Lee, S. et al., "Retinal atlas statistics from color fundus images," SPIE Medical Imaging: Image Processing. 2010, 10 pages.
Light Shaping Diffusers Including a Rear Projection System. Physical Optics Corp. 2003. Reprinted from the Aug. 1996 issue of Photonics Spectra © Laurin Publishing Co., Inc. [Retrieved on Apr. 15, 2010]. Retrieved from the Internet: <URL: http://www.poc.com/isd/default.asp?page=applications&sub=dst> p. 1. paragraph 7 (3 pages).
Lliev, M. E. et al., "Morphometric Assessment of Normal, Suspect and Glaucomatous Optic Discs with Stratus OCT and HRT II," Eye, 2005, pp. 1-12.
Maintz, J. et al., "A Survey of Medical Image Registration," Medical Image Analysis, Mar. 1998; pp. 1-36, vol. 2, No. 1.
Martus et al., "Multivariate Approach for Quantification of Morphologic and Functional Damage in Glaucoma," Investigative Ophthalmology & Visual Science, pp. 1099-1110, vol. 41, No. 5.
Muramatsu, C. et al., "Automated selection of major arteries and veins for measurement of arteriolar-to-venular diameter ratio on retinal fundus images," Computerized Medical Imaging and Graphics, 2011, pp. 472-480, vol. 35.
Niemeijer, M. et al. "Automatic Detection of Red Lesions in Digital Color Fundus Photographs," IEEE Transactions on Medical Imaging, May 2005, pp. 584-592, vol. 24, No. 5.
Niemeijer, M. et al. "Retinopathy Online Challenge: Automatic Detection of Microaneurysms in Digital Color Fundus Photographs," IEEE Transactions on Medical Imaging, Jan. 2010, pp. 185-195, vol. 29, No. 1.
Niemeijer, M. et al., "Automatic determination of the artery-vein ratio in retinal images," Proceedings of the SPIE, Medical Imaging, 2010: Computer-Aided Diagnosis, Mar. 2010, two pages, vol. 7624 (with English abstract).
Quellec, G. et al., Optimal Filter Framework for Automated, Instantaneous Detection of Lesions in Retinal Images, IEEE Transactions on Medical Imaging, Feb. 2011, pp. 523-533, vol. 30, No. 2.
Quellec, G. et al., "Optimal Wavelet Transform for the Detection of Microaneurysms in Retina Photographs," IEEE Transactions on Medical Imaging, Sep. 2008, pp. 1230-1241, vol. 27, No. 9.
Ritter, N. et al., "Registration of Stereo and Temporal Images of the Retina," IEEE Transactions on Medical Imaging, May 1999, pp. 404-418, vol. 18.
"Segmentation"; Image Processing Fundamentals—Segmentation; Website: www.ph.tn.tudelft.nl/Courses/FIP/frames/fip-Segmenta. html, 12 pages.
Sharrett, A.R. et al., "Retinal Arteriolar Diameters and Elevated Blood Pressure," American Journal of Epidemiology, 1999, pp. 263-270, vol. 150, No. 3.
Staal, J. et al., "Ridge-Based Vessel Segmentation in Color Images of the Retina," IEEE Transactions on Medical Imaging, Apr. 2004, pp. 501-509, vol. 23, No. 4.
Swindale, N. V. et al., "Automated Analysis of Normal and Glaucomatous Optic Nerve Head Topography Images," Investigative Ophthalmology & Visual Science, Jun. 2000, pp. 1730-1742, vol. 41, No. 7.
Szymczak, A. et al., "Coronary vessel trees from 3D imagery: A topographical approach," Medical Image Analysis, 2006, pp. 548-559, vol. 10, No. 4.
Ter Haar Romeny, B.M., "Front-End Vision and Multi-Scale Image Analysis," Springer, 2003, pp. xiii-xviii (with Introduction and Table of contents).
Toderici, G. D. et al., "Evaluation of Variability and Significance of Fundus Camera Lens Distortion, " Proceedings of the 26th Annual International Conference of the IEEE EMBS, Sep. 1-5, 2004, pp. 1497-1500, San Francisco, CA, USA.
Tuytelaars, T. et al., "Matching Widely Separated Views Based on Affine Invariant Regions," International Journal of Computer Vision, 2004, pp. 61-85, vol. 59, No. 1.
U.S. Appl. No. 16/158,093, filed Apr. 9, 2020, 20 pages.
U.S. Appl. No. 16/158,093, filed Sep. 9, 2020, 24 pages.
U.S. Appl. No. 16/158,093, filed Oct. 11, 2018, Abramoff et al.
U.S. Appl. No. 60/666,868, filed Mar. 31, 2005, Abramoff et al.
U.S. Appl. No. 60/788,767, filed Apr. 3, 2006, Abramoff et al.
U.S. Appl. No. 60/789,045, filed Apr. 4, 2006, Abramoff et al.
U.S. Appl. No. 60/940,603, filed May 29, 2007, Abramoff et al.
U.S. Appl. No. 61/155,425, filed Feb. 25, 2009, Abramoff et al.
U.S. Appl. No. 61/420,497, filed Dec. 7, 2010, Abramoff et al.
U.S. Appl. No. 61/434,551, filed Jan. 20, 2011, Abramoff et al.
U.S. Appl. No. 61/434,647, filed Jan. 20, 2011, Abramoff et al.
U.S. Appl. No. 61/642,945, filed May 4, 2012, Abramoff et al.
U.S. Appl. No. 61/759,201, filed Jan. 31, 2013, Abramoff et al.
U.S. Appl. No. 61/790,594, filed Mar. 15, 2013, Abramoff et al.
U.S. Appl. No. 61/968,713, filed Mar. 21, 2014, Abramoff et al.
Van Ginneken, B. et al., "Computer-aided diagnosis for Diabetic Retinopathy detection in fundus images," IOP Image Processing project proposal, Apr. 5, 2002, pp. 1-23.
Vincent, L. et al., "Morphological Grayscale Reconstruction in Image Analysis: Applications and Efficient Algorithms," IEEE Transactions on Image Processing, Apr. 1993, pp. 176-201, vol. 2, No. 2.
Weng, J. et al., "Camera Calibration with Distortion Models and Accuracy Evaluation," IEEE Transactions on Pattern Analysis and Machine Intelligence, Oct. 1992, pp. 965-980, vol. 14, No. 10.
Wong, T. Y. et al., "Computer-Assisted Measurement of Retinal Vessel Diameters in the Beaver Dam Eye Study. Methodology, Correlation between Eyes, and Effect of Refractive Errors," Ophthalmology, Jun. 2004, pp. 1183-1190, vol. 111, No. 6.
Xu, J. et al., "Comparative Study of Two Calibration Methods on Fundus Camera," Proceedings of the 25th Annual International Conference of the IEEE EMBS, Sep. 17-21, 2003, pp. 576-579, Cancun, Mexico.
Yale Medicine, "Imaging the eye. Medicine's new eyes," Winter/Spring 1998, pp. 1-3.
Zomet, A. et al., "Seamless Image Stitching by Minimizing False Edges," IEEE Transactions on Image Processing, Apr. 2006, pp. 969-977, vol. 15, No. 4.

\* cited by examiner

High level steps for leveraging CNN feature detection for disease detection in retinal images 1) Create spatial maps of disease feature cnn outputs 2) Train CNN that feed into MLP to generate disease output Alternative steps for leveraging CNN feature detection for disease detection in retinal images 1) Create scalar representations of disease features 2) Train MLP to generate disease output

AUTONOMOUS DIAGNOSIS OF A DISORDER IN A PATIENT FROM IMAGE ANALYSIS

CROSS-REFERENCE TO RELATED APPLICATION(S)

This application is a divisional application of U.S. application Ser. No. 15/092,421, filed on Apr. 6, 2016, which claims priority from U.S. Provisional Application No. 62/143,301, filed Apr. 6, 2015, each of which is hereby incorporated herein by reference in its entirety for all purposes.

FIELD OF THE INVENTION

Disclosed herein are systems and methods for retinal feature detection, learning, and classification for the purpose of retinal disease detection.

BACKGROUND OF THE INVENTION

Detecting, segmenting and classifying objects and other structures of interest in a background retinal, and even any other medical, image is crucial for detection and diagnosis of disease, its absence, as well as for biometrics. Deep neural networks (NNs), including Convolutional Neural Networks, as well as other types of multilevel neural networks, are an existing method for improved feature learning, classification, and detection. They have been applied to a wide range of different image types, including medical images). However, the straightforward use of NNs to classify entire retinal images or image subsets (patches) for these tasks, as is the art in other problems, may not lead to maximized performance in retinal images. This is because the problem is underconstrained: there is a large variance in color, structure, and texture of the normal retina as well as a large diversity of objects, and a large variability in shapes, colors, textures, and other features of these objects, versus a relatively sparse number of retinal images with annotations at a sufficient level, that these machine learning algorithms require for optimal performance. Medical images with annotations are sparse and expensive, because it both ultimately derives from patients so there are ethical concerns that prevent an unlimited number of images to be obtained, as well annotating these images which requires experts in that field, in contrast with other domains especially in computer vision where NNs are typically can be trained on unlimited number of images can be obtained and annotation can typically be done by any adult.

To tackle this, other approaches have introduced additional variance into the object samples by translating, rotating and otherwise deforming patches or samples artificially. However, this still does not introduce sufficient 'real' variance, in both objects, as well as backgrounds. Accordingly, there is a need in the art for a process for creating, training and applying NNs to retinal images in order to maximally successfully detect objects in backgrounds related to disease detection in a way that is useful for retinal disease detection in patients.

BRIEF SUMMARY OF THE INVENTION

Disclosed herein are systems methods and devices for diagnosing disease in medical images. In certain aspects, disclosed is a method for training a neural network to detect features in a retinal image including the steps of: a) extracting one or more features images from a Train_0 set, a Test_0 set, a Train_1 set and a Test_1 set; b) combining and randomizing the feature images from Train_0 and Train_1 into a Training data set; c) combining and randomizing the feature images from Test_0 and Test_1 into a testing dataset; d) training a plurality of neural networks having different architectures using a subset of the training dataset while testing on a subset of the testing dataset; e) identifying the best neural network based on each of the plurality of neural networks performance on the testing data set; f) inputting images from Test_0, Train_1, Train_0 and Test_1 to the best neural network and identifying a set of false positives (positive confounders) and a set false negatives (negatives confounders) and adding the false positives and false negatives to the training dataset and testing dataset; and g) repeating steps d)-g) until an objective performance threshold is reached. Other embodiments of this aspect include corresponding computer systems, apparatus, and computer programs recorded on one or more computer storage devices, each configured to perform the actions of the methods.

Further disclosed herein is a system for detecting lesions in a retinal image including: a) a feature extractor, configured to receive retinal image input from a user, and further configured to extract image features from the retinal image, which can be a multilevel neural network or a classic feature extractor; b) a multilevel neural network, trained according to the training methods disclosed herein and configured to receive image features from the feature extractor, and further configured to output scalar image features; and c) a machine learning program, configured to receive scalar image features from the neural network and further configured to output disease diagnosis. In certain aspects, the image features are spatial distributions of image features. In further aspects, spatial distributions are heat maps. According to still further aspects, the spatial distributions are point-wise outputs.

One general aspect includes a computing device for diagnosing disease in a retinal image including: a) a processor; b) a memory that includes: i) a feature extractor system ii) a neural network; iii) a machine learning program; and iv) instructions that, when executed by the processor, cause the processor to perform acts including: receiving a retinal image and providing the retinal image to the feature extractor; extracting image features and providing image features to the neural network; generating scalar features from the image features; providing scalar features to the machine learning program; and determining whether disease is present in the retinal image. Other embodiments of this aspect include corresponding computer systems, apparatus, and computer programs recorded on one or more computer storage devices, each configured to perform the actions of the methods.

While multiple embodiments are disclosed, still other embodiments of the present invention will become apparent to those skilled in the art from the following detailed description, which shows and describes illustrative embodiments of the invention. As will be realized, the invention is capable of modifications in various obvious aspects, all without departing from the spirit and scope of the present invention. Accordingly, the drawings and detailed description are to be regarded as illustrative in nature and not restrictive.

DETAILED DESCRIPTION

Figure 1:
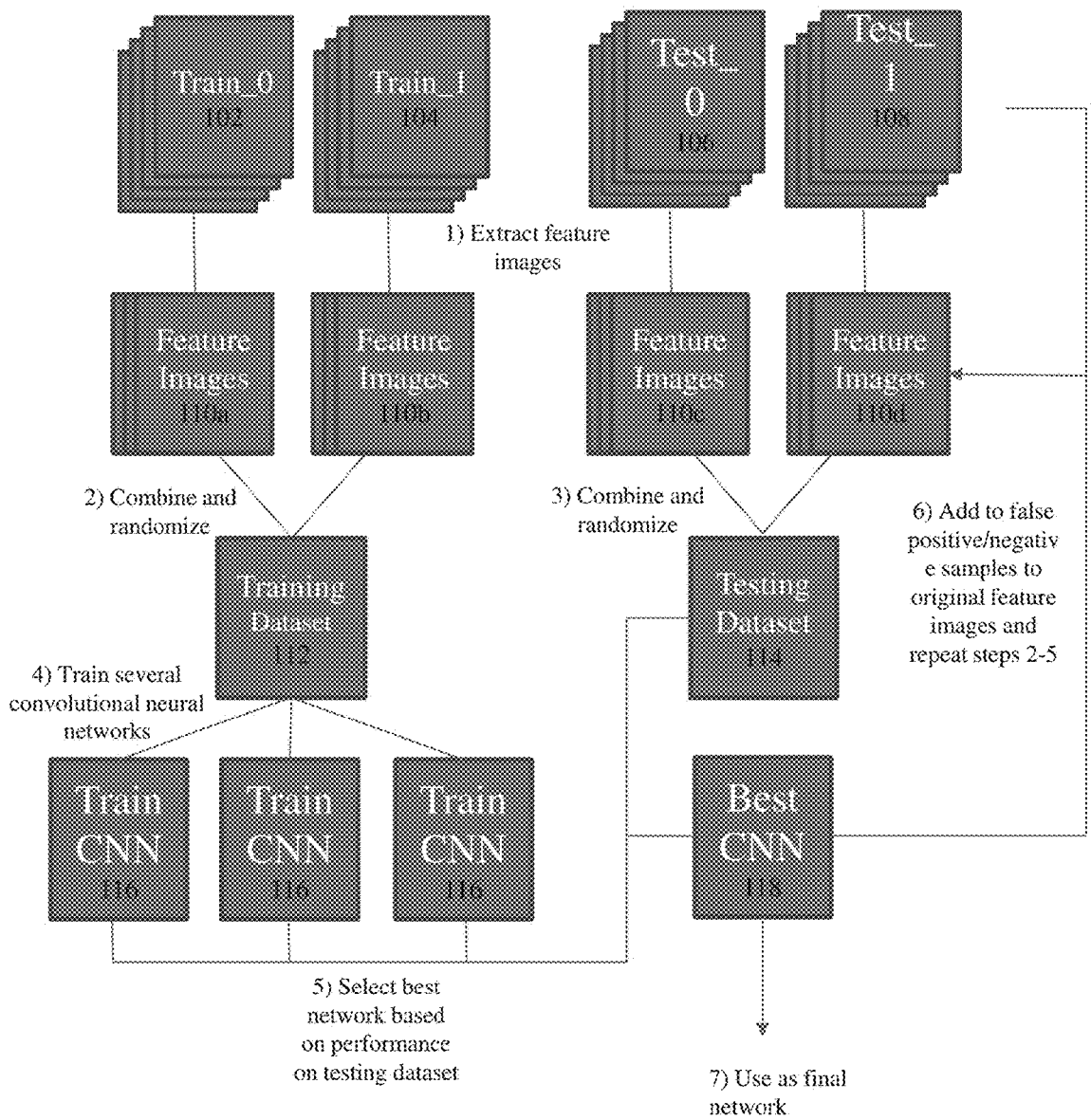
FIG. 1 is a flowchart of disclosed methods, according to certain embodiments.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint. It is also understood that there are a number of values disclosed herein, and that each value is also herein disclosed as "about" that particular value in addition to the value itself. For example, if the value "10" is disclosed, then "about 10" is also disclosed. It is also understood that when a value is disclosed that "less than or equal to" the value, "greater than or equal to the value" and possible ranges between values are also disclosed, as appropriately understood by the skilled artisan. For example, if the value "10" is disclosed the "less than or equal to 10" as well as "greater than or equal to 10" is also disclosed. It is also understood that the throughout the application, data are provided in a number of different formats, and that these data, represent endpoints and starting points, and ranges for any combination of the data points. For example, if a particular data point "10" and a particular data point 15 are disclosed, it is understood that greater than, greater than or equal to, less than, less than or equal to, and equal to 10 and 15 are considered disclosed as well as between 10 and 15.

Optional" or "optionally" means that the subsequently described event or circumstance may or may not occur, and that the description includes instances where said event or circumstance occurs and instances where it does not.

An "image" is defined as a reproduction or imitation of the form of a person or thing, or specific characteristics thereof, in digital form. An image can be, but is not limited to, a JPEG image, a PNG image, a GIF image, a TIFF image, or any other digital image format known in the art. "Image" is used interchangeably with "photograph."

An "object" is defined as a tangible entity with defined borders contained within a digital photograph. An object can be a pixel or a group of pixels.

A "feature(s)" is defined as a group of one or more descriptive characteristics of objects that can discriminate for disease. A feature can be a numeric attribute.

A "set of features" is defined as a customized group of one or more descriptive characteristics of objects which most accurately classify objects indicative of disease.

A "threshold" is defined as a level, point, or value above which something is true or will take place and below which it is not or will not, such levels, points, or values include probabilities, sizes in pixels, and values representing pixel brightness.

"Thresholding" is defined as modifying pixels that contain a characteristic either above or below a selected threshold value.

As used herein, "Train_0" means a set of images that have been reviewed by one or more experts as not having the Feature of Interest anywhere within the image. These images are used exclusively in the training dataset. This data should be selected from a general dataset containing many different sources.

As used herein, "Test_0" means a set of images that have been reviewed by one or more experts as not having the Feature of Interest anywhere within the image. These images are used exclusively in the testing dataset. This data should be selected from a general dataset containing many different sources.

As used herein, "Train_1" means a set of images that have the Feature of Interest labeled by an expert. These images are separated for use exclusively in the training dataset. This data should be selected from a general dataset containing many different sources.

As used herein, "Test_1" means a set of images that have the Feature of Interest labeled by an expert. These images are separated for use exclusively in the testing dataset. This data should be selected from a general dataset containing many different sources.

As used herein, "Feature of Interest" means the object(s) in a retinal image which the multilevel neural network is being trained to recognize. The feature of interest is generally a retinal image object that is indicative of disease and may include but is not limited to microaneurysms, dot hemorrhages, flame-shaped hemorrhages, sub-intimal hemorrhages, sub-retinal hemorrhages, pre-retinal hemorrhages, micro-infarctions, cotton-wool spots, and yellow exudates.

As used herein, "Feature Image" means a vector image (or image stack). At the most basic level this may be the color planes of an image (e.g. RGB image would be a Feature Image with vector length of 3). Other Feature Images may include a variety of pre-processed versions of the input image.

As used herein, "Epoch 1" means a complete cycle through a dataset wherein every sample and label is presented to the network for training/testing.

As used herein, "Positive sample" means a sample that contains an instance of what is trying to be detected.

As used herein, "Negative sample" means a sample that does not contain an instance of what is trying to be detected.

As used herein, "Confounder Sample" a sample that causes a false-positive or false-negative outcome from a multilevel neural network including convolutional neural networks.

Disclosed herein are systems methods and devices for diagnosing disease in medical images. In certain aspects, disclosed is a method for training a neural network to detect features in a retinal image including the steps of: a) extracting one or more features images from a Train_0 set, a Test_0 set, a Train_1 set and a Test_1 set; b) combining and randomizing the feature images from Train_0 and Train_1 into a Training data set; c) combining and randomizing the feature images from Test_0 and Test_1 into a testing dataset; d) training a plurality of neural networks having different architectures using a subset of the training dataset while testing on a subset of the testing dataset; e) identifying the best neural network based on each of the plurality of neural networks performance on the testing data set; f) inputting images from Test_0, Train_1, Train_0 and Test_1 to the best neural network and identifying a limited number of false positives and false negative and adding the false positives and false negatives to the training dataset and testing dataset; and g) repeating steps d)-g) until an objective performance threshold is reached. Other embodiments of this aspect include corresponding computer systems, apparatus, and computer programs recorded on one or more computer storage devices, each configured to perform the actions of the methods.

According to certain embodiments, the feature extracting step further includes sampling a region of interest (ROI). In certain aspects, sampling is performed by random sampling. In further aspects, sampling is performed by grid sampling. According to still further aspects, the disclosed method further comprises the step of resampling the images of Train_0, Test_0, Train_1 and Test_1 after the identification of the best neural network with a sampling method different from the sampling method performed in the initial sampling. In yet further aspects, images undergo preprocessing prior to the step of extracting one or more Feature Images. According to still further aspects, the objective performance threshold is softmax_loss, mean squared error, area under the ROC curve or accuracy. According to certain aspects, the method further includes the steps of: a) creating a spatial distribution of features in an image; and b) inputting the spatial distribution of features into a neural network trained according to steps (a)-(f), where the output of the neural network is disease diagnosis. According to further aspects, the spatial distribution of features is a heat map. According to yet further aspects, the spatial distribution of features is a point-wise output from feature detection. In certain aspects, the step of creating a spatial distribution of features in an image further includes creating scalar features. In certain aspects, the scalar features are created as histograms. The method further including training a machine learning algorithm, where the input is scalar features and the output is disease diagnosis.

Further disclosed herein is a system for detecting lesions in a medical image including: a) a feature extractor, configured receive retinal image input from a user, and further configured to extract image features from the retinal image; b) a neural network, trained according to the training methods disclosed herein and configured to receive image features from the feature extractor, and further configured to output scalar image features; and c) a machine learning program, configured to receive scalar image features from the neural network and further configured to output disease diagnosis. In certain aspects, the image features are spatial distributions of image features. In further aspects, spatial distributions are heat maps. According to still further aspects, the spatial distributions are point-wise outputs.

One general aspect includes a computing device for diagnosing disease in a medical image including: a) a processor; b) a memory that includes: i) a feature extractor system ii) a neural network; iii) a machine learning program; and iv) instructions that, when executed by the processor, cause the processor to perform acts including: receiving a medical image and providing the medical image to the feature extractor; extracting image features and providing image features to the neural network; generating scalar features from the image features; providing scalar features to the machine learning program; and determining whether disease is present in the medical image. Other embodiments of this aspect include corresponding computer systems, apparatus, and computer programs recorded on one or more computer storage devices, each configured to perform the actions of the methods.

In certain aspects computing device is a remotely accessible server. In further aspects, the neural network of the disclosed computing device has been trained with steps including: a) extracting one or more features images from a Train_0 set, a Test_0 set, a Train_1 set and a Test_1 set; b) combining and randomizing the feature images from Train_0 and Train_1 into a training data set; c) combining and randomizing the feature images from test_0 and test_1 into a testing dataset; d) training a plurality of neural networks having different architectures using a subset of the training dataset while testing on a subset of the testing dataset; e) identifying the best neural network based on each of the plurality of neural networks performance on the testing data set; f) inputting images from Test_0, Train_1, Train_0 and Test_1 to the best neural network and identifying a limited number of false positives and false negative and adding the false positives and false negatives to the training dataset and testing dataset; and g) repeating steps d)-g) until an objective performance threshold is reached. Implementations of the described techniques may include hardware, a method or process, or computer software on a computer-accessible medium.

Disclosed herein are systems and methods which are applied to medical images. In certain embodiments, the disclosed systems and methods are applied in a comprehensive automated retinal disease screening system that takes one or more retinal images of a single patient, applies the method to each of the images to detect a variety features related to disease, and then combines the results with the outputs of more classical disease detection methods using a combination method into a single number indicating the likelihood of the presence of disease. This disclosure demonstrates a process for creating, training and applying CNNs to retinal images in order to successfully detect features related to disease detection in a way that is useful for retinal disease detection in patients. Further, the same general method is able to combine features for the purpose of diagnosing disease from the detected features.

Retinal lesion detection algorithms using a classic detection pipeline, wherein image information is processed by a candidate detector; then a candidate segmentor; then a feature extractor; then a classifier, are well known. The systems and methods disclosed herein are an improvement on classic detection methods. The disclosed system provides for the application of a feature learning and detection/classification method, deep neural networks to the detection and localization of features relating to retinal disease in retinal images. The amount of data normally required to obtain good results from deep networks is challenging in medical images, the disclosed systems and methods implement several innovations to make deep learning on medical images with limited ground-truth maximally effective.

The conventional approach is limited by the user's ability to identify features that they deem important to the classical system's method for classification through intuition. The instantly disclosed systems and methods allows the system to generate features, some of which may not be intuitive even to the expert, from more general representations of the usefulness for the detection, localization and classification of features, particularly disease features, in the retina. Other approaches have used statistical methods to generate such features, for example, by using a maximum variance objective function. However such an objective function does not guarantee an optimal solution on a more suitable metric, namely a detection or classification performance metric as is used by the multilevel neural network including convolutional neural networks.

The iterative nature used for dataset generation with positive and negative confounders allows for the system's influences to be updated with less common and more difficult to classify samples. This is a critical step for the application to retinal images that, by their nature, vary widely in appearance due to anatomical differences between subjects. Further variation is added by differences between cameras and operator skill levels. Since only a limited set of manually, expert annotated data is available, this step is critical in order to achieve generalizable results on large datasets.

The aspects of the disclosed method that set it apart from current systems and processes known in the art include, but are not limited to: 1) the steps needed to extract positive and negative samples; 2) the way in which samples are augmented within the dataset to achieve satisfactory detection results; 3) the way the datasets are iteratively updated to increase the influence of less common confounders in the training process and 4) the way in which detection and classification results are combined for patient level disease diagnosis; 5) the dataset produced in the final iteration of this invention is more suitable for discovery and training of other CNN architectures by relative over-representation of confounder samples.

The embodiments described herein relate generally to diagnostic medical images. Although any type of medical image can be used, these embodiments will be illustrated in conjunction with retinal images. However, the disclosed methods systems and devices can also be used with medical images of other ocular structures, or any other biological tissues the image of which can support the diagnosis of a disease condition. Furthermore, the methods disclose herein can be used with a variety of imaging modalities including but not limited to: computed tomography (CT), magnetic resonance imaging (MRI), computed radiography, magnetic resonance, angioscopy, optical coherence tomography, color flow Doppler, cystoscopy, diaphanography, echocardiography, fluorescein angiography, laparoscopy, magnetic resonance angiography, positron emission tomography, single-photon emission computed tomography, x-ray angiography, nuclear medicine, biomagnetic imaging, colposcopy, duplex Doppler, digital microscopy, endoscopy, fundoscopy, laser surface scan, magnetic resonance spectroscopy, radiographic imaging, thermography, and radio fluoroscopy.

Creating a CNN for Feature Detection

The following disclosed methods are applied to create and refine a deep NN for feature detection in retinal images.

1. Feature Image Extraction

Figure 4:
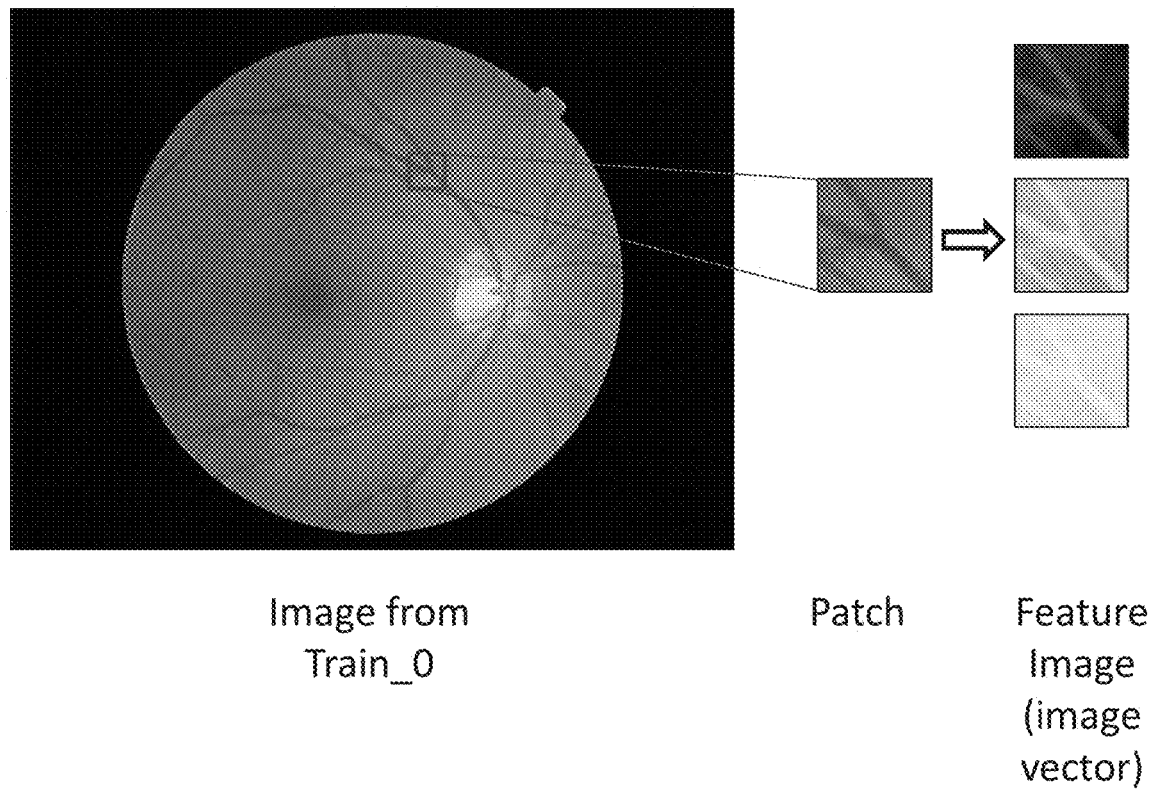
FIG. 4 is exemplary retinal image and Feature Image, according, to certain embodiments.
Figure 5:
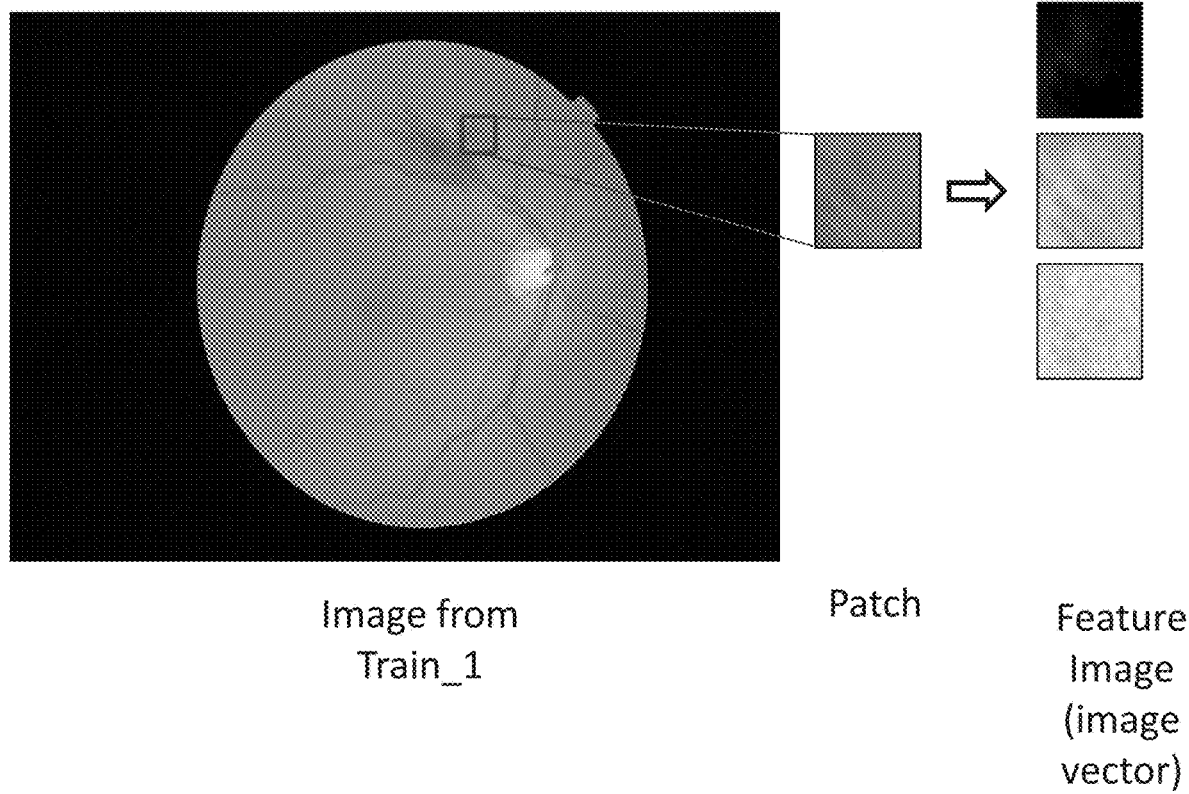
FIG. 5 is exemplary retinal image and Feature Image, according to certain embodiments.

As shown in the flow chart of FIG. 1, a limited number of Feature Images 110a-d are extracted from each of Train_0 102, Test_0 106, Train_1 104 and Test_1 108. Feature image extraction involves sampling a region of interest (ROI) from the image. FIG. 4 shows a representative sample of ROI sampling from Train_0, with the ROI identified as "patch." FIG. 4 shows a representative sample of ROI sampling from Train_1, with the ROI identified as "patch." According to certain embodiments, the limited number of Feature Images 110 are randomly sampled from the image. According to further embodiments, the limited number of Feature Images are structurally sampled, such as by way of grid-sampling, from the image. In the case of images with disease marked as ground truth, target sampling may be used to sample only certain desired points, such as regions marked by experts.

In certain implementations, Feature Image extraction may be constrained such that the entirety of the image is within the field-of-view. Alternatively, techniques may be applied to allow for reliable extraction of Feature Images that lie partially outside the field-of-view, such as mirroring pixel intensities across the field-of-view boundary.

According to certain embodiments, the Feature Images may undergo preprocessing, prior to feature extraction. The preprocessing step may comprise steps such as image normalization, background normalization, or color plane manipulation. Other preprocessing steps known in the art are also possible.

According to certain implementations, disease features may be extracted and placed on a normalized image to create an enhanced source image. A large problem specific to retinal images is variation in the background of the image due to variation in the image acquisition process and anatomical differences between individuals. To increase the robustness of the trained NN against such influences, lesions and disease features can be isolated from images containing disease and placed in normal images that exhibit certain kinds of background variation. These enhanced source images are then treated as positive image during the Feature Image extraction steps. This disease feature transfer can be accomplished by either image processing methods or by building a (deep) model.

Importantly, if the source image contains disease features, only positive samples are extracted. This is important as it removes the necessity to identify every disease feature in the image.

Several methods may be used to determine if a Feature Image has disease in the image using a marked ground truth. For example, if at least N points in the central x % of the sample patch is marked as disease, then a positive determination is made. Values for N can be 1 or higher and values of x can be any value greater than 0.

According to certain implementations, an additional data augmentation step is performed. In these implementations, a data augmentation step may be applied to a set or subset of the sampled patches. Exemplary data augmentation steps include but are not limited to modifying the sampled patch in a controlled manner such as flipping, scaling, rotating, translating or saturating a feature(s) within the Feature Image. Saturation of a feature within the Feature Image means substantially reducing the contrast of that channel of the Feature Image. This is especially helpful for retinal images as the red plane in retinal images is occasionally fully saturated.

2. Combine and randomize the Feature Images from Train_0 102 and Train_1 104

Following the Feature Image extraction step, Feature Images 110 from Train_0 110a and Train_1 110b are combined and randomized, including the Feature Image augmentations (if any) into a training dataset 112.

3. Combine and randomize the Feature Images from Test_0 110c and Test_1 110d, including Feature Image augmentations, into a testing dataset 114.

4. Train a plurality of NNs 116 with different architectures using (part of) the training dataset 112 while testing on (part of) the testing dataset 114.

Once the training dataset 112 and the testing dataset 114 are defined, they are used to train and test a plurality of NNs 116. The architectures of the plurality of NNs may be predefined, or iteratively defined using an optimization algorithm such as provided by a hyperparameter optimization method. In certain embodiments, the initial training runs are performed with only a subset of the training dataset and testing dataset.

5. Select the best NN(s).

The selection of the best NN is based on a pre-defined objective function, e.g. on the ability to separate the positive from negative samples within the test dataset 114. Values that may be an indicator of class separation include softmax_loss, mean squared error, area under the ROC curve or accuracy.

6. Run the Best NN(s) on the Original Train_0 102, Test_0 106, Train_1 104 and Test_1 108.

In certain implementations, following the selection of the best NN(s) 118, those selected can then be run on the original Train_0 102, Test_0 106, Train_1 104 and Test_1 108. A limited number of false positives and/or false negatives, known as positive and negative confounders are selected to add to the training set and testing set, as no single example should exist in either sets. While adding data, it is important to randomize the samples for more effective NN optimization.

According to certain embodiments, the sampling scheme can be changed from the initial sampling method. This provides an effective method to find positive and negative confounders. For instance, if grid sampling was originally used, off-setting the grid will make it so samples are not duplicated in the train or test set. Augmentation of the confounder samples using methods defined above is effective to increase the number of confounder samples in the training set which in turn increases their influence on the NN training. This can be effective to increase the influence of confounder samples even if they are uncommon.

7. (for confounder training) Re-run steps 5-7 as many times as necessary to obtain satisfactory results on some performance measure, e.g. good results for the final patient level disease classification.

Leveraging NN Feature Detection for Disease Detection in Retinal Images

Figure 2:
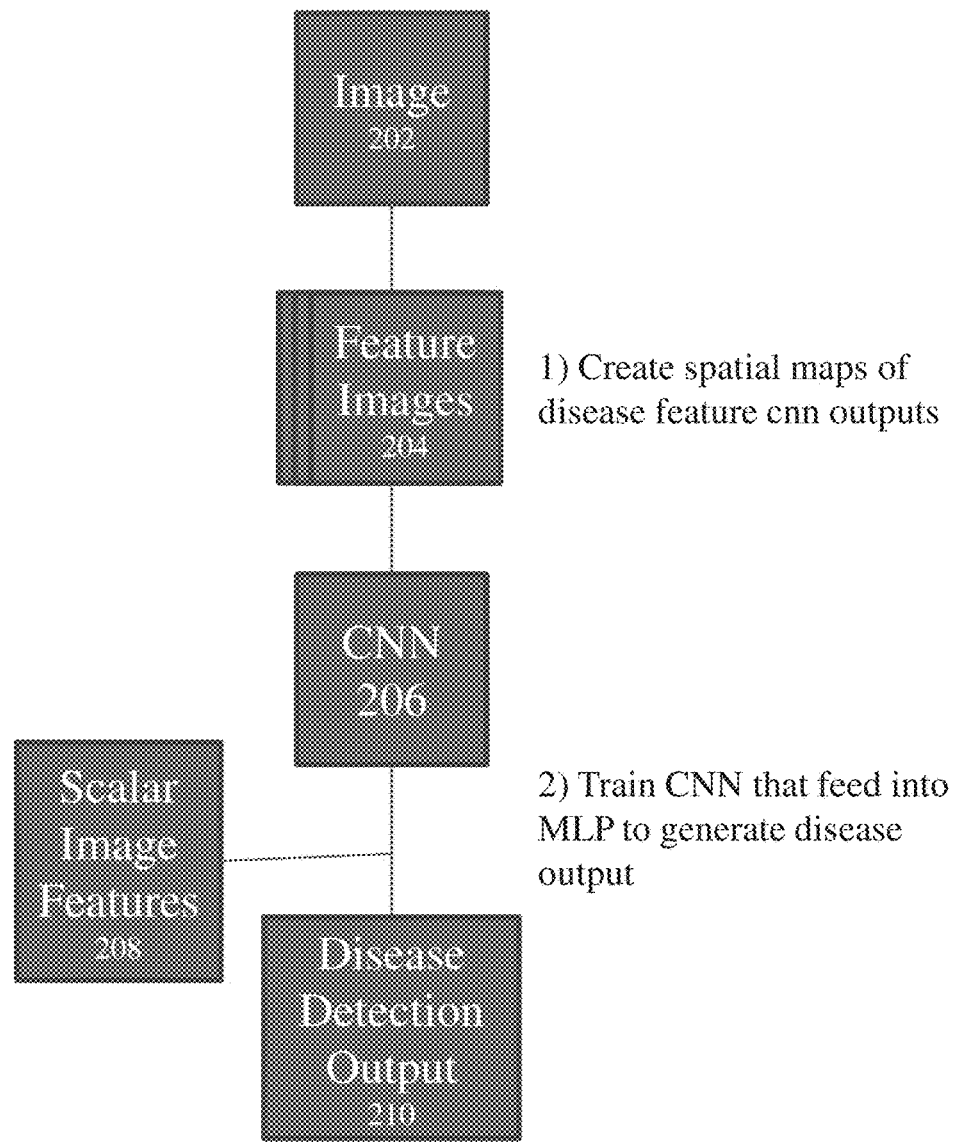
FIG. 2 is a flowchart of disclosed methods, according to certain embodiment.

Once one or more of the plurality of NNs are trained according to the methods disclosed above, the trained NNs can be utilized for disease detection in retinal images 202 according to at least the following methods, best shown in FIG. 2.

1. Spatial Distribution of Features in an Image

For all features, feature detection of images 204 is performed to get a spatial distribution of features in the image. These spatial distributions may be created in a variety of ways. In certain embodiments, spatial distribution is created as point-wise outputs from feature detection. In certain alternative embodiments, spatial distribution of features in the image is provided by creation of heat maps. Heat maps are created by spreading the influence of the feature detection at a point over an area (either over a distance or the entirety of the initial Feature Image space). In both cases, the heat maps may be post-processed using techniques such as blurring, sharpening, or other techniques known in the art.

2. Train a NN 206 with input using the same procedure as above where the input is, in part, the spatial feature maps and the output is a disease diagnosis 210.

Once the spatial distribution of features in an image is established, a NN can be leveraged by inputting the spatial feature map into the NN 206 and outputting a disease diagnosis. The confounder training mechanism still applies.

Figure 3:
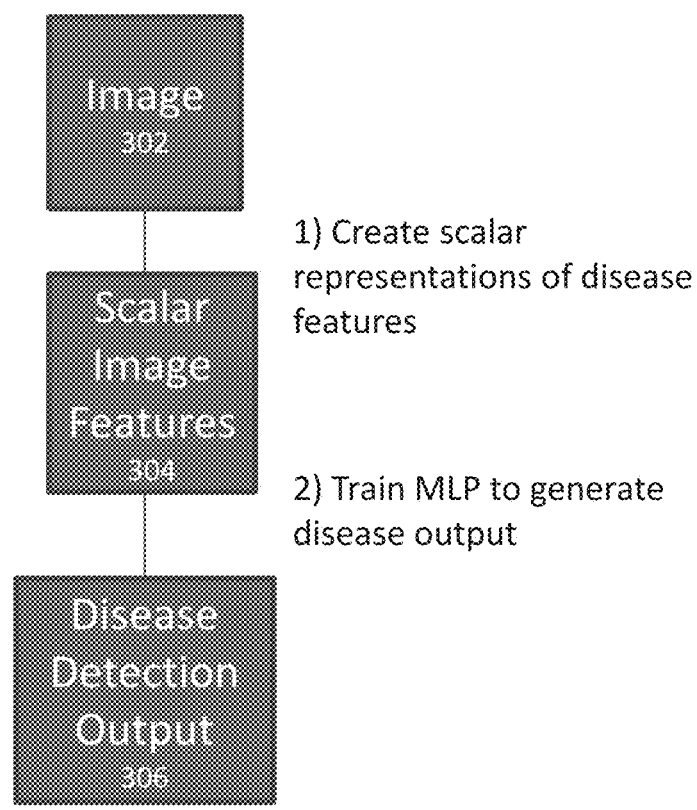
FIG. 3 is a flowchart of disclosed methods, according to certain, embodiment.

Alternative Steps for Leveraging NN Feature Detection for Disease Detection in Retinal Images According to certain alternative embodiments, once one or more of the plurality of NNs are trained according to the methods disclosed above, the trained NNs can be utilized for disease detection in retinal images according to at least the following methods, best shown in FIG. 3.

1. For all features, perform feature detection of images 302 to get a spatial distribution of features in the image.

These spatial distributions may be created in a variety of ways. In certain embodiments, spatial distribution is created as point-wise outputs from feature detection. In certain alternative embodiments, spatial distribution of features in the image is provided by creation of heat maps. Heat maps are created by spreading the influence of the feature detection at a point over an area (either over a distance or the entirety of the initial Feature Image space). In both cases, the heat maps may be post-processed using techniques such as blurring, sharpening, or other techniques known in the art.

2. Create scalar features from the spatial feature maps

Once the spatial feature maps are created, the feature maps can be used to create scalar features 304 using, for instance, histograms. As the feature map also provides information about the location of the detected disease features, this location information could be included in the extracted scalar features 304. In certain embodiments, it may be desirable to skip step 1 and simply convert the output of feature detection directly into scalar features, bypassing the creation of a spatial feature map. Regardless of whether or not a feature map is created, the location information stays available.

3. Train a conventional machine learning algorithm where the output is a disease diagnosis 306 or staging.

According to further embodiments, the disclosed method further comprises chaining together a plurality of trained CNN systems. In these embodiments, each of the trained CNN performs a subtask required for the analysis. The outputs of each of the CNNs is then and classifying the outputs together into a single image or patient level output that combines these inputs using a classifier or CNN. The conventional approach in the art is to leverage CNNs to tackle the entire problem, which especially with sparse data in medical imaging leads to intractable processing times. Here however, the task is subdivided into different detection/segmentation/classification tasks that are each trained optimally as provided in the disclosed methods, and are then tied together into a second stage. This can be repeated in multiple stages. Further, this allows, for the use of the same training images for all different modules.

The present methods and systems can be operational with numerous other general purpose or special purpose computing system environments or configurations. Examples of well known computing systems, environments, and/or configurations that can be suitable for use with the system and method comprise, but are not limited to, personal computers, server computers, laptop devices, and multiprocessor systems. Additional examples comprise set top boxes, programmable consumer electronics, network PCs, minicomputers, mainframe computers, distributed computing environments that comprise any of the above systems or devices, and the like.

The processing of the disclosed methods and systems can be performed by software components. The disclosed system and method can be described in the general context of computer-executable instructions, such as program modules, being executed by one or more computers or other devices. Generally, program modules comprise computer code, routines, programs, objects, components, data structures, etc. that perform particular tasks or implement particular abstract data types. The disclosed method can also be practiced in grid-based and distributed computing environments where tasks are performed by remote processing devices that are linked through a communications network. In a distributed computing environment, program modules can be located in both local and remote computer storage media including memory storage devices.

Figure 6:
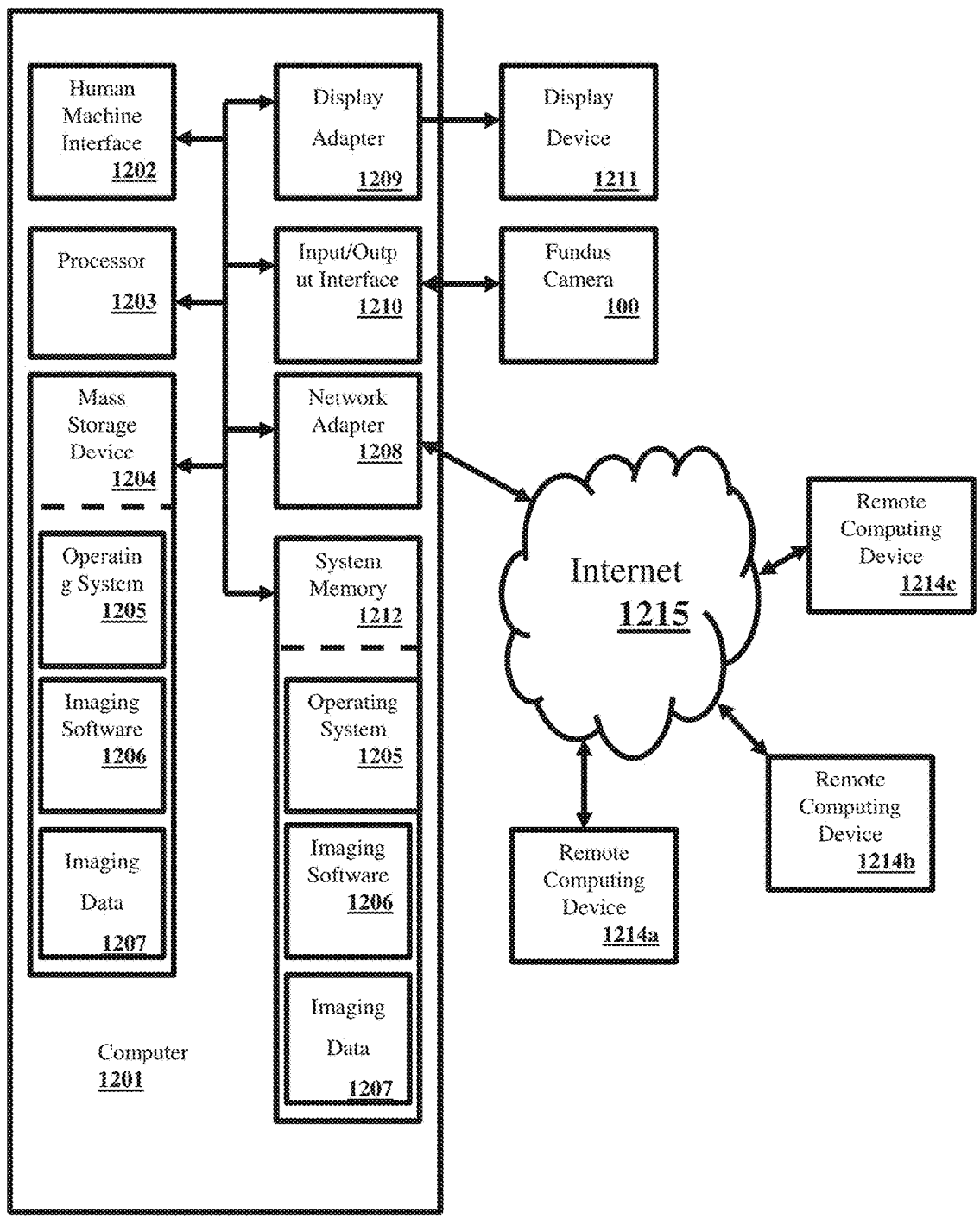
FIG. 6 is shows sample distribution with and without confounder training, according to certain embodiments.

Further, one skilled in the art will appreciate that the systems and methods disclosed herein can be implemented via a computing device, best shown in FIG. 6, in the form of a computer 1201. The components of the computer 1201 can comprise, but are not limited to, one or more processors or processing units 1203, a system memory 1212, and a system bus 1213 that couples various system components including the processor 1203 to the system memory 1212. In the case of multiple processing units 1203, the system can utilize parallel computing.

The system bus 1213 represents one or more of several possible types of bus structures, including a memory bus or memory controller, a peripheral bus, an accelerated graphics port, and a processor or local bus using any of a variety of bus architectures. By way of example, such architectures can comprise an Industry Standard Architecture (ISA) bus, a Micro Channel Architecture (MCA) bus, an Enhanced ISA (EISA) bus, a Video Electronics Standards Association (VESA) local bus, an Accelerated Graphics Port (AGP) bus, and a Peripheral Component Interconnects (PCI), a PCI-Express bus, a Personal Computer Memory Card Industry Association (PCMCIA), Universal Serial Bus (USB) and the like. The bus 1213, and all buses specified in this description can also be implemented over a wired or wireless network connection and each of the subsystems, including the processor 1203, a mass storage device 12012, an operating system 1205, imaging software 1206, imaging data 1207, a network adapter 1208, system memory 1212, an Input/Output Interface 1210, a display adapter 1209, a display device 1211, and a human machine interface 1202, can be contained within one or more remote computing devices 1214*a,b,c* at physically separate locations, connected through buses of this form, in effect implementing a fully distributed system.

The computer 1201 typically comprises a variety of computer readable media. Exemplary readable media can be any available media that is accessible by the computer 1201 and comprises, for example and not meant to be limiting, both volatile and non-volatile media, removable and non-removable media. The system memory 1212 comprises computer readable media in the form of volatile memory, such as random access memory (RAM), and/or non-volatile memory, such as read only memory (ROM). The system memory 1212 typically contains data such as imaging data 1207 and/or program modules such as operating system 1205 and imaging software 1206 that are immediately accessible to and/or are presently operated on by the processing unit 1203.

In another aspect, the computer 1201 can also comprise other removable/non-removable, volatile/non-volatile computer storage media. By way of example, FIG. 6 illustrates a mass storage device 12012 which can provide non-volatile storage of computer code, computer readable instructions, data structures, program modules, and other data for the computer 1201. For example and not meant to be limiting, a mass storage device 12012 can be a hard disk, a removable magnetic disk, a removable optical disk, magnetic cassettes or other magnetic storage devices, flash memory cards, CD-ROM, digital versatile disks (DVD) or other optical storage, random access memories (RAM), read only memories (ROM), electrically erasable programmable read-only memory (EEPROM), and the like.

Optionally, any number of program modules can be stored on the mass storage device 12012, including by way of example, an operating system 1205 and imaging software 1206. Each of the operating system 1205 and imaging software 1206 (or some combination thereof) can comprise elements of the programming and the imaging software 1206. Imaging data 1207 can also be stored on the mass storage device 12012. Imaging data 1207 can be stored in any of one or more databases known in the art. Examples of such databases comprise, DB2®, Microsoft® Access, Microsoft® SQL Server, Oracle®, mySQL®, PostgreSQL®, and the like. The databases can be centralized or distributed across multiple systems.

In another aspect, the user can enter commands and information into the computer 1201 via an input device (not shown). Examples of such input devices comprise, but are not limited to, a keyboard, pointing device (e.g., a "mouse"), a microphone, a joystick, a scanner, tactile input devices such as gloves, and other body coverings, and the like These and other input devices can be connected to the processing unit 1203 via a human machine interface 1202 that is coupled to the system bus 1213, but can be connected by other interface and bus structures, such as a parallel port, game port, an IEEE 13912 Port (also known as a Firewire port), a serial port, or a universal serial bus (USB).

In yet another aspect, a display device 1211 can also be connected to the system bus 1213 via an interface, such as a display adapter 1209. It is contemplated that the computer 1201 can have more than one display adapter 1209 and the computer 1201 can have more than one display device 1211. For example, a display device can be a monitor, an LCD (Liquid Crystal Display), or a projector. In addition to the display device 1211, other output peripheral devices can comprise components such as speakers (not shown) and a printer (not shown) which can be connected to the computer 1201 via Input/Output Interface 1210. Any step and/or result of the methods can be output in any form to an output device. Such output can be any form of visual representation, including, but not limited to, textual, graphical, animation, audio, tactile, and the like. In an aspect, a retinal image acquisition device 101 can be coupled to computer 1201 via Input/Output Interface 1210. For example, fundus camera 100 can transfer images captured to the computer 1201 for analysis and storage. In further embodiments, input images earlier acquired a stored on a hard drive or other storage media and are uploaded by way of the Input/Output Interface.

The computer 1201 can operate in a networked environment using logical connections to one or more remote computing devices 1214*a,b,c*. By way of example, a remote computing device can be a personal computer, portable computer, a server, a router, a network computer, a peer device or other common network node, and so on. Logical connections between the computer 1201 and a remote computing device 1214*a,b,c* can be made via a local area network (LAN) and a general wide area network (WAN). Such network connections can be through a network adapter 1208. A network adapter 1208 can be implemented in both wired and wireless environments. Such networking environments are conventional and commonplace in offices, enterprise-wide computer networks, intranets, and the Internet 1215.

For purposes of illustration, application programs and other executable program components such as the operating system 1205 are illustrated herein as discrete blocks, although it is recognized that such programs and components reside at various times in different storage components of the computing device 1201, and are executed by the data processor(s) of the computer. An implementation of imaging software 1206 can be stored on or transmitted across some form of computer readable media. Any of the disclosed methods can be performed by computer readable instructions embodied on computer readable media. Computer readable media can be any available media that can be accessed by a computer. By way of example and not meant to be limiting, computer readable media can comprise "computer storage media" and "communications media." "Computer storage media" comprise volatile and non-volatile, removable and non-removable media implemented in any method or technology for storage of information such as computer readable instructions, data structures, program modules, or other data. Exemplary computer storage media comprises, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computer.

EXAMPLES

The following examples are put forth so as to provide those of ordinary skill in the art with a complete disclosure and description of certain examples of how the compounds, compositions, articles, devices and/or methods claimed herein are made and evaluated, and are intended to be purely exemplary of the invention and are not intended to limit the scope of what the inventors regard as their invention. However, those of skill in the art should, in light of the present disclosure, appreciate that many changes can be made in the specific embodiments which are disclosed and still obtain a like or similar result without departing from the spirit and scope of the invention.

Figure 7:
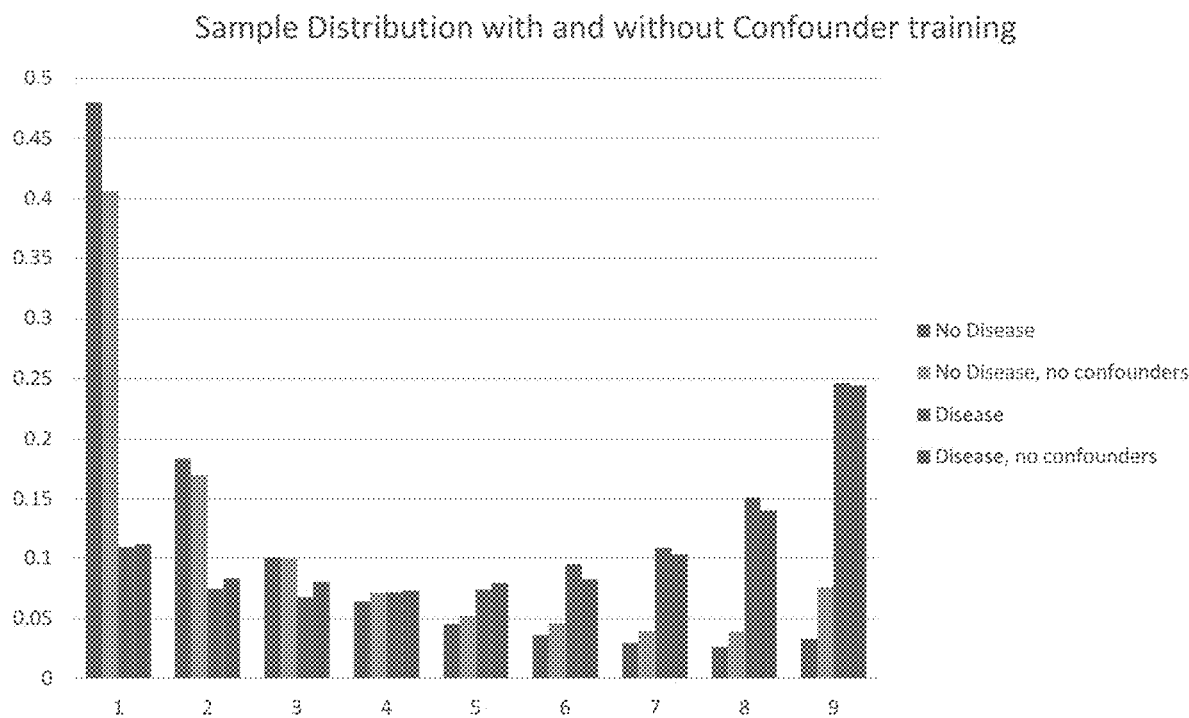
FIG. 7 shows exemplary data of disease detection in retinal images, according to certain embodiments.

FIG. 7 shows sample distribution with and without confounder training. As can be seen, the distribution of both the positive and negative samples improve (more negative samples pulled left and positive samples pushed right). At a threshold of 0.8, ~33.5 samples marked as false positive would be expected. After confounder training, only 19.3 samples are marked as false positive at same threshold. This is done by artificially making the hardest 0.5% of the population 7% of the training population which causes the CNN to focus the training on the hard to train samples.

A confounder sample is a sample that causes a false-positive or false-negative outcome from a CNN. They are difficult to classify correctly because confounder samples often look more like the object that the CNN is detecting versus the background, for example a flash artifact having similar appearance to exudates in a retinal image).

Conventional wisdom in the field suggests that to improve CNN training performance, use more data. This is, in general, a good rule. However, the difficulty with resolving confounder samples is that the features causing the sample to be a confounder are rare within the dataset (again, for example flash artifacts in retinal images). Their rarity means that they have little influence on the CNN optimization. This patent claims that to improve performance on confounders, one should increase their presence in the training data to a level much higher than their representation in the whole of the training data. By inflating their relative presence in the training data, one is effectively increasing their influence on the CNN optimization.

To illustrate this, an experiment was run using a CNN that detects the presence of exudates in a retinal image. First, a CNN was trained using a random sampling of samples from the training data. The CNN was then applied on the training data to find false positive samples, positive confounders; these samples were added to the training data from the original training to create the "confounder-enhanced training dataset." To compare, additional samples were randomly added to the training dataset to create the "random-enhanced training dataset." The CNN was then retrained against the confounder-enhanced training dataset and the random-enhanced training dataset to compare the effects of confounder training versus random addition of data to the training dataset.

Figure 8:
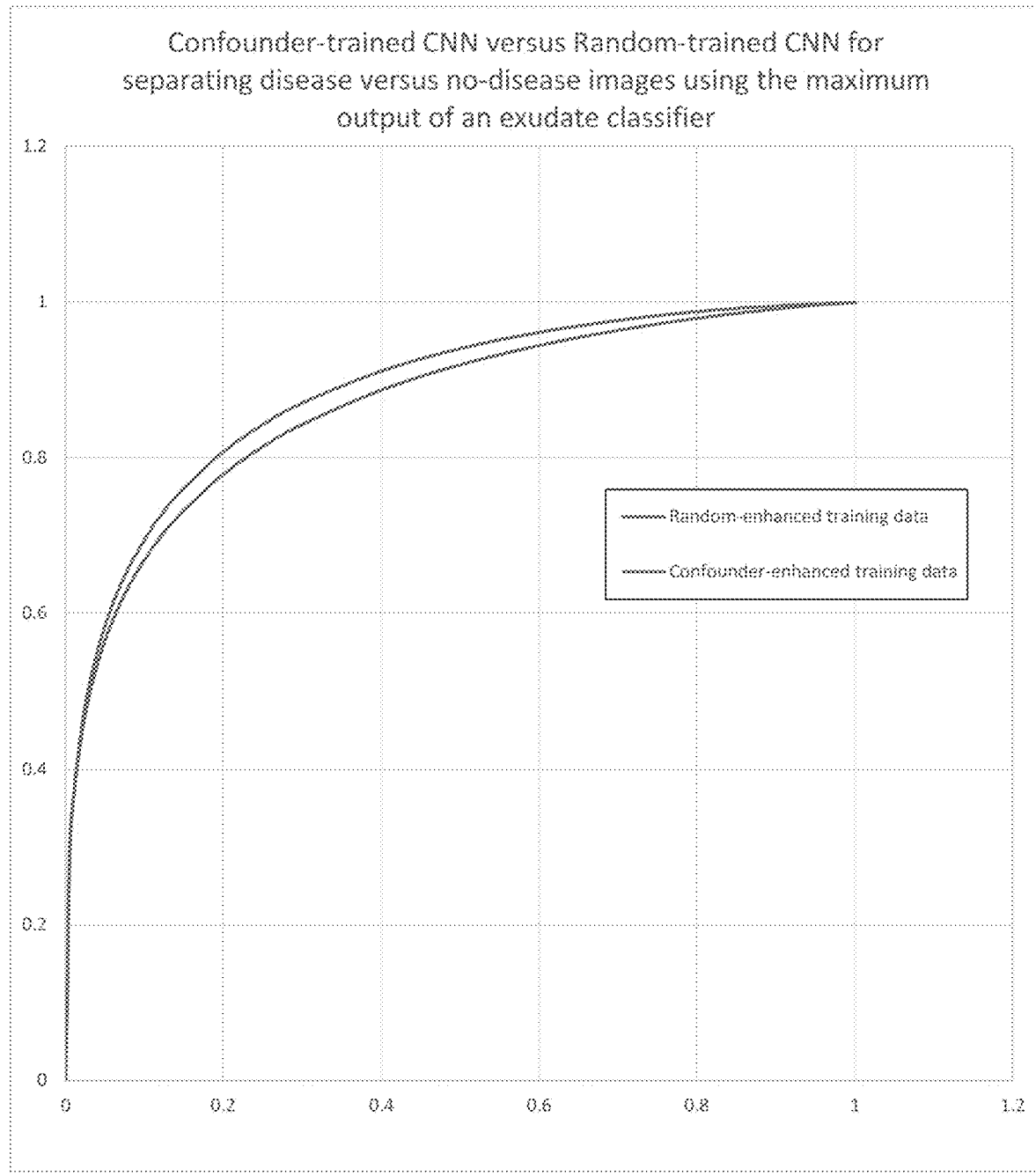
FIG. 8 shows exemplary data of disease detection in retinal images, according to certain embodiments.

The results (shown in FIG. 8) illustrate that after random addition of samples, the specificity (given a sensitivity of 99%) was estimated at 98.36%. Using the confounder-enhanced training dataset, the specificity (given a sensitivity of 99%) was estimated at 98.64%. This is a reduction in the false-positive noise by 17.1% for classifications at the pixel-level.

To illustrate that this can enable better image-level classifications, images in a test set were stratified into disease and no-disease based on the maximum response of the CNN in the image (results were spatially blurred to remove isolated maxima). An ROC was created from the maximum response values. The AUC for the confounder-enhanced training data was 0.886 versus 0.869 for the random-enhanced training data.

Although the present invention has been described with reference to preferred embodiments, persons skilled in the art will recognize that changes may be made in form and detail without departing from the spirit and scope of the invention.

What is claimed is:
1. A method for diagnosing a disease condition in a patient, the method comprising:
    receiving an input image of a portion of a patient's body;
    applying the input image to a feature extraction model, the input image comprising a plurality of locations, the feature extraction model comprising a first trained machine learning model that is configured to generate an output that comprises, for each respective location of each of the plurality of locations in the input image, an indication that the input image contains an object of interest at the respective location, where the object of interest is indicative of a disease;
    applying the output of the feature extraction model to a diagnostic model, the diagnostic model comprising a second trained machine learning model that is configured to output a diagnosis of a disease condition in the patient based on taking as input the indications for each of the plurality of locations in the input image as output by the feature extraction model, where the second trained machine learning model is trained by:
        applying ground truth training data that comprises labels about whether a corresponding image depicts a disease and, at each location of a plurality of locations of the corresponding image, indicia that the corresponding image contains an object of interest that is indicative of a disease, to the second machine learning model, and
        adjusting the second machine learning model to fit the ground truth training data, thereby causing the second machine learning model to become trained; and outputting the determined diagnosis of the disease condition in the patient obtained from the diagnostic model.

2. The method of claim 1, wherein applying the input image to the feature extraction model comprises:
obtaining a set of samples of the input image, each sample corresponding to a location in the input image; and
for each sample of the set of samples, applying the sample to the feature extraction model, the feature extraction model configured to output an indication that the sample contains an object of interest.

3. The method of claim 2, wherein the set of samples is obtained by at least one of random sampling and grid sampling.

4. The method of claim 1, wherein the indication that the input image contains an object of interest at one or more locations comprises a mathematical representation of the object of interest.

5. The method of claim 1, wherein the output of the feature extraction model comprises a heat map corresponding to indications that the input image contains an object of interest at the plurality of locations in the input image.

6. The method of claim 1, wherein the output of the feature extraction model comprises a point-wise output corresponding to indications that the input image contains an object of interest at the plurality of locations in the input image.

7. The method of claim 1, wherein one or more of the objects of interest is indicative of disease.

8. The method of claim 1, wherein the portion of the patient's body includes at least a portion of the patient's eye, and the determined diagnosis of the disease condition in the patient comprises a diagnosis of a disorder manifesting in the retina.

9. The method of claim 8, wherein one or more of the objects of interest is selected from a group consisting of: a microaneurysm, a dot hemorrhage, a flame-shaped hemorrhage, a sub-intimal hemorrhage, a sub-retinal hemorrhage, a pre-retinal hemorrhage, a micro-infarction, a cotton-wool spot, and a yellow exudate.

10. The method of claim 1, wherein the input image is obtained by at least one of: computed tomography (CT), magnetic resonance imaging (MRI), computed radiography, magnetic resonance, angioscopy, optical coherence tomography, color flow Doppler, cystoscopy, diaphanography, echocardiography, fluorescein angiography, laparoscopy, magnetic resonance angiography, positron emission tomography, single-photon emission computed tomography, x-ray angiography, nuclear medicine, biomagnetic imaging, colposcopy, duplex Doppler, digital microscopy, endoscopy, fundoscopy, laser surface scanning, magnetic resonance spectroscopy, radiographic imaging, thermography, and radio fluoroscopy.

11. A non-transitory computer-readable medium comprising memory with instructions encoded thereon for diagnosing a disease condition in a patient, the instructions, when executed, causing one or more processors to perform operations, the instructions comprising instructions to:
receive an input image of a portion of a patient's body;
apply the input image to a feature extraction model, the input image comprising a plurality of locations, the feature extraction model comprising a first trained machine learning model that is configured to generate an output that comprises, for each respective location of each of the plurality of locations in the input image, an indication that the input image contains an object of interest at the respective location, where the object of interest is indicative of a disease;
apply the output of the feature extraction model to a diagnostic model, the diagnostic model comprising a second trained machine learning model that is configured to output a diagnosis of a disease condition in the patient based on taking as input the indications for each of the plurality of locations in the input image as output by the feature extraction model, where the second trained machine learning model is trained by:
applying ground truth training data that comprises labels about whether a corresponding image depicts a disease and, at each location of a plurality of locations of the corresponding image, indicia that the corresponding image contains an object of interest that is indicative of a disease, to the second machine learning model, and
adjusting the second machine learning model to fit the ground truth training data, thereby causing the second machine learning model to become trained; and
output the determined diagnosis of the disease condition in the patient obtained from the diagnostic model.

12. The non-transitory computer-readable medium of claim 11, wherein the instructions to apply the input image to the feature extraction model comprise instructions to:
obtain a set of samples of the input image, each sample corresponding to a location in the input image; and
for each sample of the set of samples, apply the sample to the feature extraction model, the feature extraction model configured to output an indication that the sample contains an object of interest.

13. The non-transitory computer-readable medium of claim 12, wherein the set of samples is obtained by at least one of random sampling and grid sampling.

14. The non-transitory computer-readable medium of claim 11, wherein the indication that the input image contains an object of interest at one or more locations comprises a mathematical representation of the object of interest.

15. The non-transitory computer-readable medium of claim 11, wherein the output of the feature extraction model comprises a heat map corresponding to indications that the input image contains an object of interest at the plurality of locations in the input image.

16. The non-transitory computer-readable medium of claim 11, wherein the output of the feature extraction model comprises a point-wise output corresponding to indications that the input image contains an object of interest at the plurality of locations in the input image.

17. The non-transitory computer-readable medium of claim 11, wherein one or more of the objects of interest is indicative of disease.

18. The non-transitory computer-readable medium of claim 11, wherein the portion of the patient's body includes at least a portion of the patient's eye, and the determined diagnosis of the disease condition in the patient comprises a diagnosis of a disorder manifesting in the retina.

19. The non-transitory computer-readable medium of claim 18, wherein one or more of the objects of interest is selected from a group consisting of: a microaneurysm, a dot hemorrhage, a flame-shaped hemorrhage, a sub-intimal hemorrhage, a sub-retinal hemorrhage, a pre-retinal hemorrhage, a micro-infarction, a cotton-wool spot, and a yellow exudate.

20. The non-transitory computer-readable medium of claim 11, wherein the input image is obtained by at least one of: computed tomography (CT), magnetic resonance imaging (MRI), computed radiography, magnetic resonance, angioscopy, optical coherence tomography, color flow Doppler, cystoscopy, diaphanography, echocardiography, fluorescein angiography, laparoscopy, magnetic resonance angiography, positron emission tomography, single-photon emission computed tomography, x-ray angiography, nuclear medicine, biomagnetic imaging, colposcopy, duplex Doppler, digital microscopy, endoscopy, fundoscopy, laser surface scanning, magnetic resonance spectroscopy, radiographic imaging, thermography, and radio fluoroscopy.

21. A system for diagnosing a disease condition in a patient, the system comprising:
  memory with instructions encoded thereon; and
  one or more processors that, when executing the instructions, are caused to perform operations comprising:
    receiving an input image of a portion of a patient's body;
    applying the input image to a feature extraction model, the input image comprising a plurality of locations, the feature extraction model comprising a trained machine learning model that is configured to generate an output that comprises, for each respective location of each of the plurality of locations in the input image, an indication that the input image contains an object of interest at the respective location, where the object of interest is indicative of a disease;
    applying the output of the feature extraction model to a diagnostic model, the diagnostic model comprising a second trained machine learning model that is configured to output a diagnosis of a disease condition in the patient based on taking as input the indications for each of the plurality of locations in the input image as output by the feature extraction model, where the second trained machine learning model is trained by:
      applying ground truth training data that comprises labels about whether a corresponding image depicts a disease and, at each location of a plurality of locations of the corresponding image, indicia that the corresponding image contains an object of interest that is indicative of a disease, to the second machine learning model, and
      adjusting the second machine learning model to fit the ground truth training data, thereby causing the second machine learning model to become trained; and
    outputting the determined diagnosis of the disease condition in the patient obtained from the diagnostic model.

22. The system of claim 21, wherein applying the input image to the feature extraction model comprises:
  obtaining a set of samples of the input image, each sample corresponding to a location in the input image; and
  for each sample of the set of samples, applying the sample to the feature extraction model, the feature detection model configured to output an indication that the sample contains an object of interest.

23. The system of claim 22, wherein the set of samples is obtained by at least one of random sampling and grid sampling.

24. The system of claim 21, wherein the indication that the input image contains an object of interest at one or more locations comprises a mathematical representation of the object of interest.

25. The system of claim 21, wherein the output of the feature extraction model comprises a heat map corresponding to indications that the input image contains an object of interest at the plurality of locations in the input image.

26. The system of claim 21, wherein the output of the feature extraction model comprises a point-wise output corresponding to indications that the input image contains an object of interest at the plurality of locations in the input image.

27. The system of claim 21, wherein one or more of the objects of interest is indicative of disease.

28. The system of claim 21, wherein the portion of the patient's body includes at least a portion of the patient's eye, and the determined diagnosis of the disease condition in the patient comprises a diagnosis of a disorder manifesting in the retina.

29. The system of claim 28, wherein one or more of the objects of interest is selected from a group consisting of: a microaneurysm, a dot hemorrhage, a flame-shaped hemorrhage, a sub-intimal hemorrhage, a sub-retinal hemorrhage, a pre-retinal hemorrhage, a micro-infarction, a cotton-wool spot, and a yellow exudate.

30. The system of claim 21, wherein the input image is obtained by at least one of: computed tomography (CT), magnetic resonance imaging (MRI), computed radiography, magnetic resonance, angioscopy, optical coherence tomography, color flow Doppler, cystoscopy, diaphanography, echocardiography, fluorescein angiography, laparoscopy, magnetic resonance angiography, positron emission tomography, single-photon emission computed tomography, x-ray angiography, nuclear medicine, biomagnetic imaging, colposcopy, duplex Doppler, digital microscopy, endoscopy, fundoscopy, laser surface scanning, magnetic resonance spectroscopy, radiographic imaging, thermography, and radio fluoroscopy.

* * * * *